United States Patent [19]

Skraba

[11] Patent Number: 4,681,743
[45] Date of Patent: Jul. 21, 1987

[54] CATALYTIC CRACKING APPARATUS

[75] Inventor: Frank W. Skraba, Sweeny, Tex.

[73] Assignee: Phillips Petroleum Company, Bartlesville, Okla.

[21] Appl. No.: 786,276

[22] Filed: Oct. 10, 1985

Related U.S. Application Data

[63] Continuation of Ser. No. 541,933, Oct. 14, 1983, abandoned.

[51] Int. Cl.$^4$ .............................................. B01J 8/18
[52] U.S. Cl. ............................. 422/140; 422/144; 422/145; 422/214; 261/78.2; 261/79.2; 208/157
[58] Field of Search ............... 422/144, 145, 213, 214, 422/140; 208/127, 157, 158; 239/427.5, 428, 431, 432, 434, 558; 261/78 A, 78 R, 79 A

[56] References Cited

U.S. PATENT DOCUMENTS

| | | | |
|---|---|---|---|
| 692,798 | 2/1902 | Seltzer | 239/434 |
| 2,937,988 | 5/1960 | Polack | 208/127 |
| 3,246,960 | 4/1966 | Sharp et al. | 422/214 |
| 3,622,079 | 11/1971 | Greenwood | 239/434 |
| 3,785,782 | 1/1974 | Cartmell | 422/214 |
| 4,160,526 | 7/1979 | Flanagan | 239/431 |
| 4,267,131 | 5/1981 | Prudhon et al. | 261/78 A |
| 4,331,533 | 5/1982 | Dean et al. | 422/145 |
| 4,345,992 | 8/1982 | Washer et al. | 208/120 |
| 4,562,046 | 12/1985 | Hays et al. | 422/214 |
| 4,563,334 | 1/1986 | Hays et al. | 422/140 |
| 4,564,502 | 1/1986 | Skraba | 422/140 |
| 4,575,414 | 3/1986 | Skraba | 208/157 |

FOREIGN PATENT DOCUMENTS

82/00109 1/1983 Australia .

OTHER PUBLICATIONS

"Spouted Beds" by K. B. Mathur and N. Epstein, 1974, Academic Press, pp. 212.

Primary Examiner—David L. Lacey
Attorney, Agent, or Firm—French and Doescher

[57] ABSTRACT

A catalytic cracking apparatus comprises a catalyst lift pot having a first diameter, a riser-reactor having a mouth connected to the lift pot and defining a second diameter which is smaller than the first diameter, and a plug member which axially extends into the lift pot from the lower end thereof. The riser-reactor and plug member are situated so that fluid flowing through the lift pot before flowing into the riser-reactor flows radially inward across an upper end surface of the plug member. The apparatus further comprises a device for introducing a fluidizable catalyst through a sidewall of the lift pot, and a device for releasing liquid oil feedstock and atomizing fluid into the lift pot from the upper end surface of the plug member.

9 Claims, 6 Drawing Figures

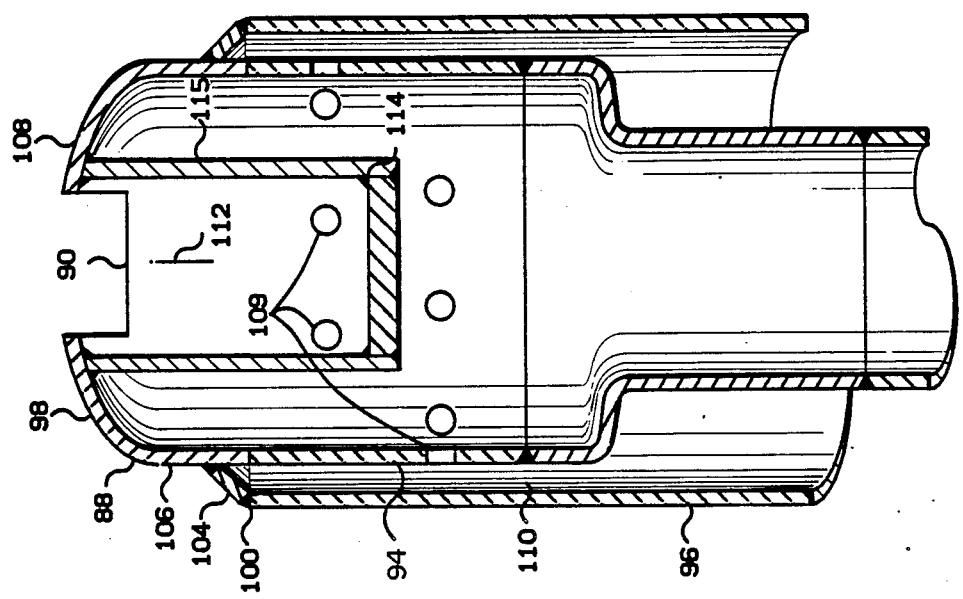
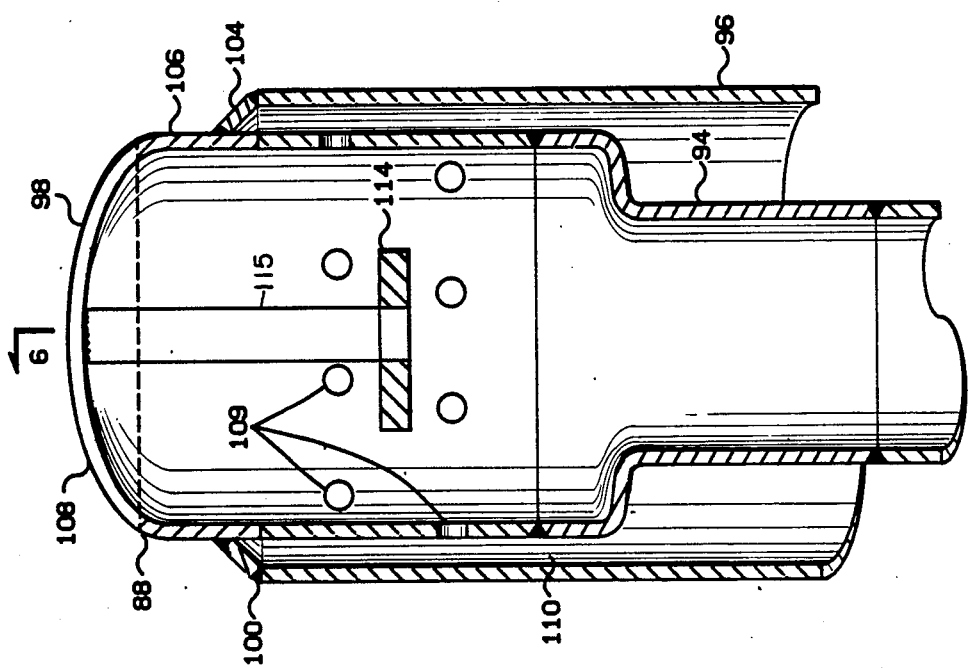
FIGURE 6
FIGURE 5

CATALYTIC CRACKING APPARATUS

BACKGROUND OF THE INVENTION

This application is a continuation of application Ser. No. 541,933, filed Oct. 14, 1983, now abandoned.

In one aspect, the invention relates to a catalytic cracking unit. In another aspect the invention relates to a catalytic cracking process.

Excessive steam use in a catalytic cracking unit is undesirable because it can deactivate the catalyst. The problem becomes more apparent as heavier feedstocks are charged to catalytic cracking units because additional steam is usually added to disperse the oil feedstock in the fluidized cracking catalyst. Special consideration must thus be given to the design of the mixing chamber for catalysts and oil where heavy feeds are to be processed.

OBJECTS OF THE INVENTION

It is an object of this invention to provide an improved mixing zone for catalyst and feedstock in a catalytic cracking unit.

It is a further object of this invention to provide a method for admixing hot cracking catalyst particles and liquid oil feedstock in a catalytic cracking unit.

It is a further object of this invention to provide an apparatus and method for cracking an oil feedstock in which usage of atomizing and fluidizing gas is an independent process variable.

STATEMENT OF THE INVENTION

In accordance with certain aspects of the invention, the lower end of a riser-reactor is connected to the upper end of a catalyst lift pot. The inside of the lift pot defines a first diameter. The mouth of the riser reactor, where it connects to the upper end of the lift pot, defines a second diameter which is smaller than the diameter of the lift pot. A plug member extends axially into the lift pot from its lower end. The plug member is generally rotationally symetric above its longitudinal axis and has an upper end surface which faces the mouth of the riser reactor. A means is associated with the upper end surface of the plug member for releasing a liquid oil feedstock and an atomizing fluid into the lift pot from the upper end surface of the plug member. The apparatus further comprises a means for introducing a fluidizable catalyst into the catalyst lift pot between the plug member and the interior surface of the lift pot.

BRIEF DESCRIPTION OF THE DRAWINGS

FIG. 5 is a cross-sectional view of a portion of the device shown in FIG. 4 which has been enlarged for detail.

FIG. 6 is a cross-sectional view of the device shown in FIG. 5 as it would appear when viewed along lines 6—6.

DETAILED DESCRIPTION OF THE INVENTION

Figure 1:
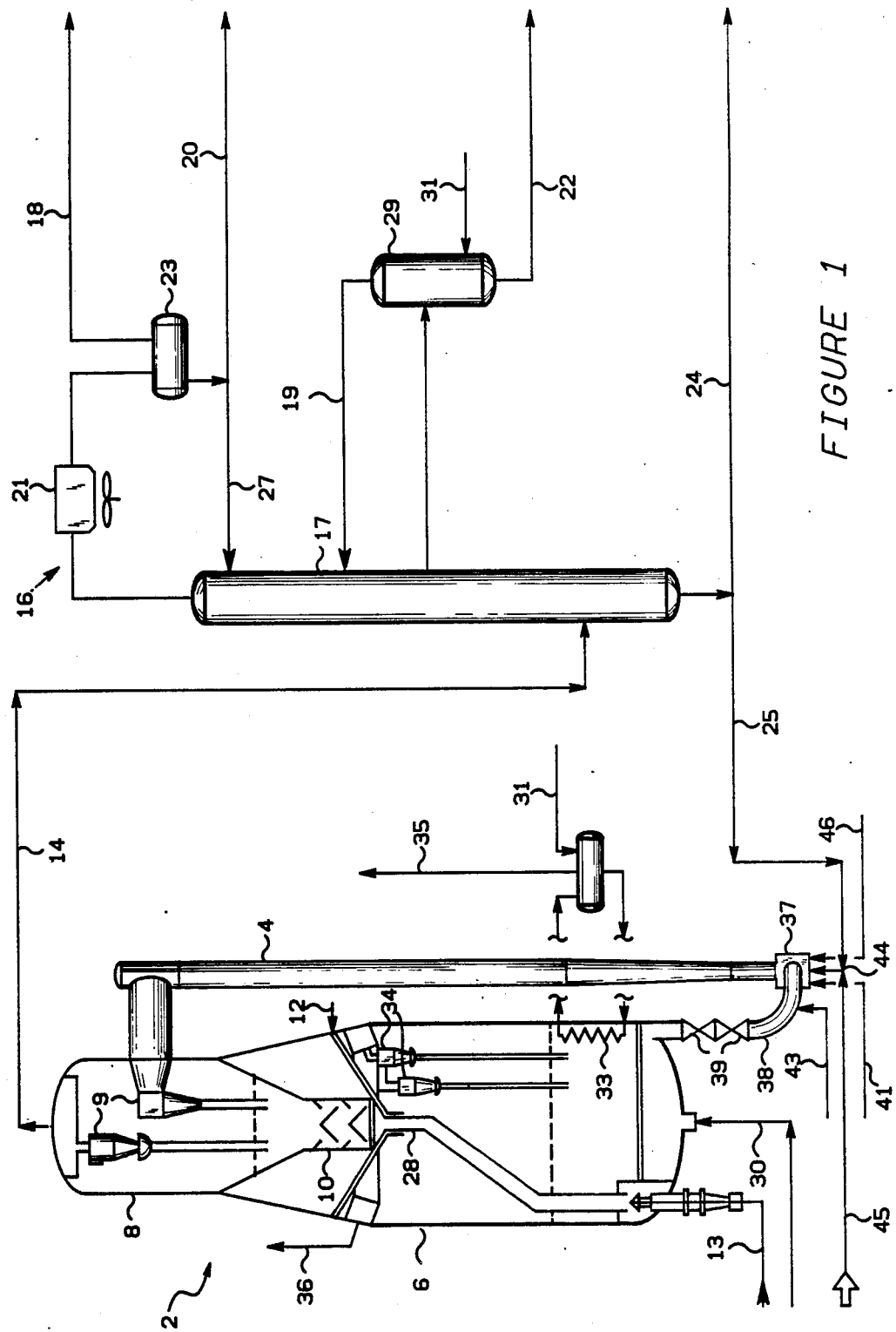
FIG. 1 schematically illustrates certain features of one type of catalytic cracking unit embodying certain features of the present invention.

With reference to FIG. 1, one type of fluid catalytic cracking unit (FCCU) 2 comprises a riser-reactor 4, a regenerator 6, a catalyst/product separation zone 8 which usually contains several cyclone separators, and a stripping section or zone 10 in which gas, usually steam such as introduced from lines 12 and 13, strips entrained hydrocarbon from the coked catalyst. Overhead product from the separation zone 8 is conveyed via line 14 to a separation zone 16 including a main fractionator 17. The product can be separated, for example, as follows. Light hydrocarbons uncondensed in condenser 21 which can be withdrawn from the zone 16 by the line 18. Gasoline range liquid accumulated in accumulator 23 can be withdrawn by the line 20 or refluxed via line 27. Distillates such as light cycle oils can be withdrawn by the line 22 from stripper 29 after being stripped with steam introduced via line 31. The overhead of light hydrocarbons 19 from the stripper which can be recycled to column 17. Bottoms which can be withdrawn by line 24 or recycled to the riser by line 25, as desired.

After being stripped in the zone 10, the cracking catalyst is conveyed from the zone 10 to the regenerator 6 by line or standpipe 28 for coke burnoff. In the regenerator 6, molecular oxygen containing gas is introduced by a line 30 which is connected to a source of oxygen-containing gas, usually air. Coke deposits are burned from the catalyst in the regenerator 6 forming an effluent gas which is separated from the catalyst in a plurality of cyclone separators 34. These flue gases are withdrawn from the regenerator 6 by the line 36. Coil 33 in the regenerator 6 is used to convert boiler feed water introduced via line 31 to high pressure steam which is withdrawn via line 35. Hot regenerated catalyst passes from the regenerator 6 to a lift pot 37 at the lower end of the riser-reactor 4 by line 38, which provides a source of hot, low carbon containing cracking catalyst particles for the riser-reactor 4.

The catalyst flow rate through the cracking unit is controlled by valves 39 which are positioned in the line 38, preferably in a vertical portion thereof.

In the lift pot 37, catalyst from the line 38 is fluidized with a fluidizing gas, usually steam, which is introduced into the lift pot 37 and/or lower portion of line 38 by lines 41 and/or 43. The oil feedstock is introduced into the lift pot 37 via a nozzle assembly 42 which preferably emits an oil spray axially into the riser-reactor 4 at the lower end thereof. A line 44 connects the nozzle assembly 42 with a source of oil feedstock such as a gas oil feed line 45 and the recycle line 25.

Figure 2:
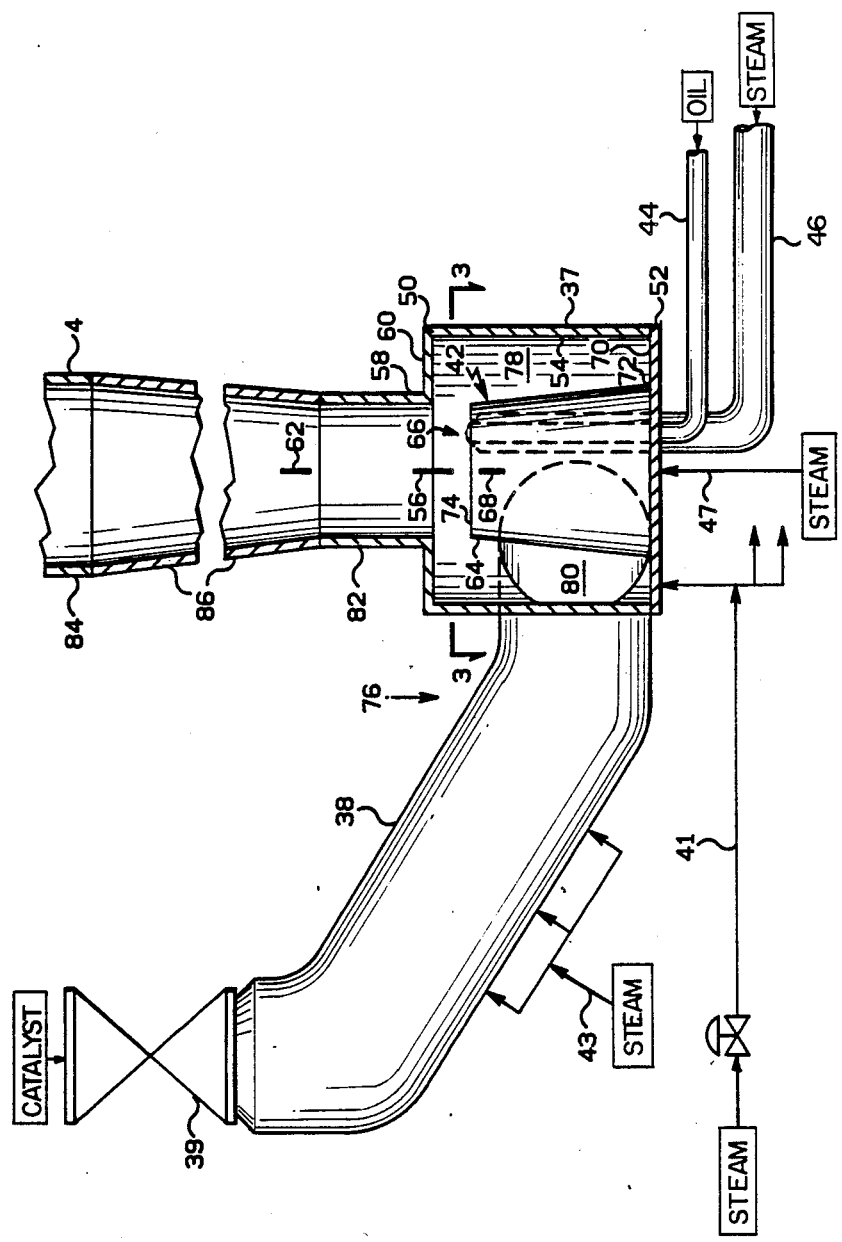
FIG. 2 schematically illustrates in greater detail a portion of the device shown in FIG. 1.

Atomizing gas such as steam can be added to the nozzle assembly 42 by lines 46 and/or 47 (see FIG. 2) which connects the nozzle assembly to a steam source.

The operating conditions for the riser-reactor 4 and regenerator 6 can be conventional. Usually, the temperature in the riser-reactor 4 will be in the range of from about 850° to about 1050° F. preferably in the range of 925° to 1025° F. for heavy oils. The oil is usually admixed with steam at a weight ratio of oil to steam in the range of from about 6:1 to about 25:1. A catalyst:oil weight ratio employed in the riser-reactor 4 is generally in the range of from about 2:1 to about 20:1, usually between about 2:1 and about 15:1, preferably between about 3:1 to about 10:1. Pressure in the riser-reactor 4 is usually between about 15 and about 60 psia (pounds per square inch absolute), preferably less than about 25 psia for heavy oils. The cracking catalyst particles generally have a size of the range of from about 20 to about 200 microns, usually between about 40 and 80 microns, preferably principally about 60 microns. Flow velocity upward in the vertical section of the riser-reactor is generally from about 10 to 30 feet per second in the lower portion up to between about 40 and about 120 feet per second in the upper portions. The contact time between the catalyst and oil in the riser-reactor is generally in the range of from about 0.25 to about 4 seconds, usually from 1 to about 3 seconds when the oil is injected into the bottom of the riser. Preferably, contact times for heavy oils are less than 2.5 seconds. The regenerator is operated at a temperature typically in the range of from about 1100° to about 1500° F., usually from about 1150° to 1450° F., and is ordinarily provided with sufficient oxygen containing gas to reduce the coke on the catalyst to a level of about 0.5 weight percent or less, preferably less than 0.1 weight percent.

Catalysts suitable for catalytic cracking includes silica-alumina or silica-magnesia synthetic microspheres or ground gels and various natural clay-type or synthetic gel-type catalysts. Most preferably, fluidizable zeolite-containing cracking catalysts are employed. Preferred catalysts can contain from about 2 to about 20 percent based on total weight of zeolitic material dispersed in a silica-alumina matrix and have a B.E.T. surface area in the range of 50–500 $m^2/g$ and a particle size chiefly in the range of 40–80 microns.

The lift pot 37 has an upper end 50, a lower end 52 and an interior surface 54. Preferably, the interior surface 54 is generally cylindrical in shape. The generally cylindrical interior surface 54 of the lift pot preferably defines a first diameter. The generally cylindrical interior surface 54 is centered about a longitudinal axis 56.

The riser-reactor 4 is connected to the upper end 50 of the lift pot 37. The riser-reactor 4 has a lower end 58 attached to the upper end 50 of the lift pot. The lower end 58 of the riser-reactor 4 defines a mouth having a second diameter where it is connected to the lift pot 37. The second diameter of the mouth of the riser-reactor is less than the diameter across the interior surface 54 of the lift pot. Preferably, the upper end 50 of the lift pot is connected to the lower end or mouth 58 of the riser-reactor by an end wall 60, the interior surface of which is preferably generally annular shaped. The riser-reactor has a longitudinal axis 62 in its lower portions which is preferably coaxial with the longitudinal axis 56 of the lift pot 37.

The nozzle assembly 42 comprises a plug member 64 and a means 66 for releasing a liquid oil feedstock into the riser-reactor 4. The plug member 64 has a longitudinal axis 68 and is generally rotationally symmetric about its longitudinal axis 68. Preferably, the longitudinal axis of the plug member 68 is coaxial with the longitudinal axis 62 of the lower portions of the riser-reactor 4 and more preferably is also coaxial with the longitudinal axis 56 of the lift pot 37. The plug member 64 extends into the lift pot 37 from the lower end 52 of the lift pot. A lower end wall 70 of the lift pot 37 connects the generally cylindrical sidewall 54 of the lift pot 37 with a lower end 72 of the plug member 64. At least the interior surface of the end wall 70 is preferably generally annularly shaped. An upper end surface 74 of the plug member 64 faces the mouth 58 of the riser-reactor 4. Preferably, the upper end surface 74 is generally planar. The plug member itself is preferably generally frustoconically shaped, converging toward the mouth of the riser-reactor from lower end 72 to upper end 74. Usually, the plug member will converge toward the longitudinal axis 62 of the riser-reactor at a half angle measured from the axis 62 of from near 0° to about 60°, usually from about 50°, to about 50°, preferably from about 5° to about 20°. Preferably, the upper end surface 74 of the plug member 64 has a diameter near that of the mouth of the riser-reactor. Generally speaking, the diameter of the upper end surface 74 will be between 0.7 and about 1.5 times the diameter of the mouth of the riser-reactor. Providing a plug member with a larger diameter will impart a greater radially inward velocity component to the cracking catalyst at the mixing point with the oil while providing the plug member with an upper end surface having a diameter toward the smaller end of the range will impart greater axial velocity to the cracking catalyst at the point of mixing with the oil. More preferably, the diameter of the upper end surface 74 of the plug member ranges from about 1 to about 1.25 times the diameter of the mouth of the riser-reactor.

The apparatus further comprises a means 76 for introducing a fluidizable catalyst into a catalyst lift chamber 78 defined between the plug member 64 and the interior surface 54 of the lift pot 37. Generally speaking, the means 76 will comprise a port 80 which opens into the chamber 78 and is connected to a source of hot catalyst particles. Preferably, the port 80 is positioned with respect to the source of hot catalyst particles so as to feed from the source the catalyst particles into the lift pot 37. Preferably, the means 76 includes the line 38 which opens into the lift pot 37 through the generally cylindrical sidewall 54. In one embodiment, the port 80 opens into the chamber 78 in a generally tangential direction so as to introduce catalyst particles into the chamber 78 to cause a swirling flow around the longitudinal axis 56 of catalyst particles in the chamber 78.

The flow rate of catalyst particles through the riser-reactor 4 can be influenced by manipulating the valve 39, and/or the flow of steam through steam lines 41 and 43. Excessive back pressure in the lift chamber 78 can reduce catalyst flow through the line 38. The admission of steam at several points through the end wall 70 toward the mouth of the riser-reactor, such as through three nozzles fed by steam line 41 at times of high pressure in the chamber 78 can assist catalyst circulation. Line 43 admits "aeration or ebulliating steam to the catalyst passing through the sloping portion of line 38. As line 38 tends more toward vertical, less steam need be admitted through the line 43. The slope of the standpipe should exceed the solids angle of slide or repose and care should be taken not to admit excessive steam through the line 43 because too much steam can hinder solids flow into the chamber 78. From a functional point of view, steam added via line 43 can be referred to as incipient fluidization steam while steam added via line 41 can be termed blast or conveying steam.

The riser-reactor 4 preferably includes a first generally cylindrical portion 82 which has the first diameter and is connected to the mouth 58 of the riser-reactor 4. A second generally cylindrical portion 84 of the riser-reactor 4 is spaced apart from the generally cylindrical portion 82. The second generally cylindrical portion 84 has a third diameter which is larger than the first diameter. A generally frustoconically shaped portion 86 of the riser-reactor 4 connects the first generally cylindrical portion 82 with the second generally cylindrical portion 84. The first generally cylindrical portion 82, the frustoconically shaped portion 86 and the second generally cylindrically shaped portion 84 are preferably coaxially aligned along the axis 62 and vertically oriented. Providing the riser 4 with a portion of restricted cross-sectional area, such as the generally cylindrical portion 82 aids in preventing back mixing. It promotes plug flow. The flow regime established at the lower portion 82 of the riser seems to prevail all the way up the riser. The tapered section such as the generally frustoconically shaped portion 86 provided just above the vaporization section maintains a high velocity of catalyst and gases. It is recognized that volume of gases increase with time due to liquid oil droplet vaporization in the riser and that less riser cross-sectional area is needed at the bottom. Toward the top of the reactor, most of the cracking reaction has occurred so a full size riser such as the portion 84 is provided spaced apart from the mouth 58. Generally speaking, the diameter of the second generally cylindrical portion of the riser will be in the range of from about 1.1 to about 2 times the diameter of the riser at the mouth 58.

Figure 3:
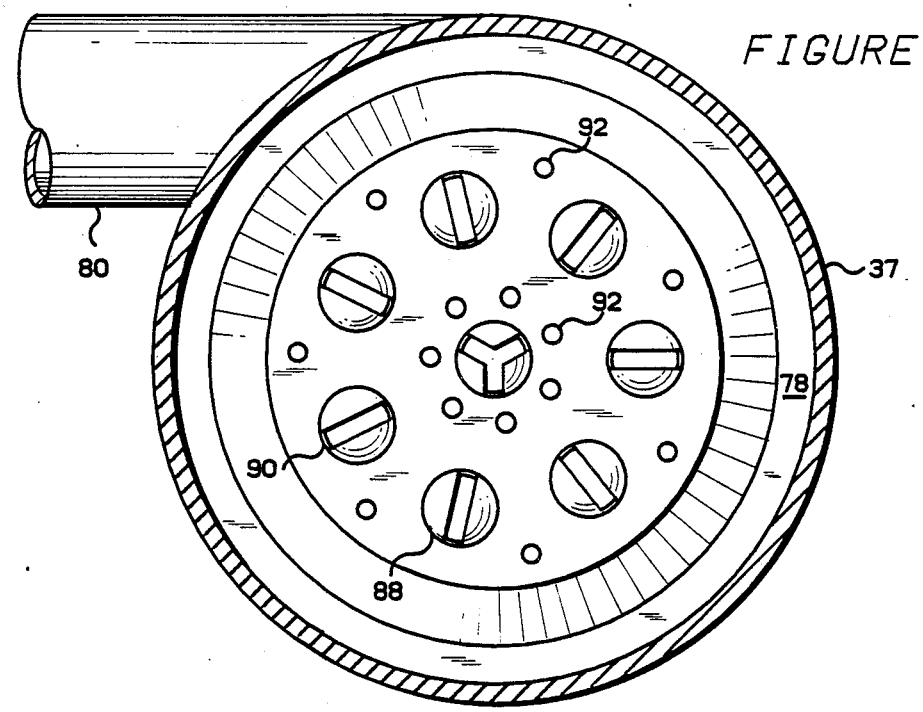
FIG. 3 is a cross-sectional view of the apparatus shown in FIG. 2 when viewed along lines 3—3.

The means 66 for releasing a liquid oil feedstock and an atomizing fluid into the lift pot 37 from the upper end surface 74 of the plug member 64 preferably comprises a plurality of bifluid nozzles 88. (See FIG. 3) The nozzles preferably open into the lift pot 37 from spaced apart positions on the upper end surface 74 of the plug member 64. Generally speaking, from about 3 to about 12 of the bifluid nozzles are preferably circumferentially spaced around the longitudinal axis 68 of the plug member 64 and at least one nozzle is positioned on or very near the axis. The bifluid nozzles 88 are provided with slots 90 for the emission of a mixture of oil feedstock and atomizing fluid and the slots are preferably generally radially oriented with respect to the longitudinal axis 68 of the plug member 64. By circumferentially spacing the nozzles around the axis of the plug member, oil and catalyst flow at approximately a 90° angle at the initial point of mixing. The nozzle on the axis helps to transport the catalyst into the riser. Where the slots 90 are radially oriented, the direction of the slot will be approximately the same as the direction of catalyst flow by the end of the plug member.

If desired, dispersal steam from line 46 can be introduced into the mouth 58 of the riser 4 from the upper end surface 74 of the plug member 64. The introduction of atomizing gas, such as steam, into the riser 4 independently of the oil feed can be advantageous in the cracking of heavy oils. This can be accomplished by the use of a plurality of conduits 92 connected to the source of atomizing gas such as the steam line 47 opening into the lift pot 37 from the upper end surface 74 of the plug member 64. The conduits 92 can open into the lift pot from spaced apart positions on the upper end surface 74 of the plug member 64, preferably from circumferentially spaced apart positions which can be arranged in one or more circular arrays centered about the longitudinal axis 68.

Figure 4:
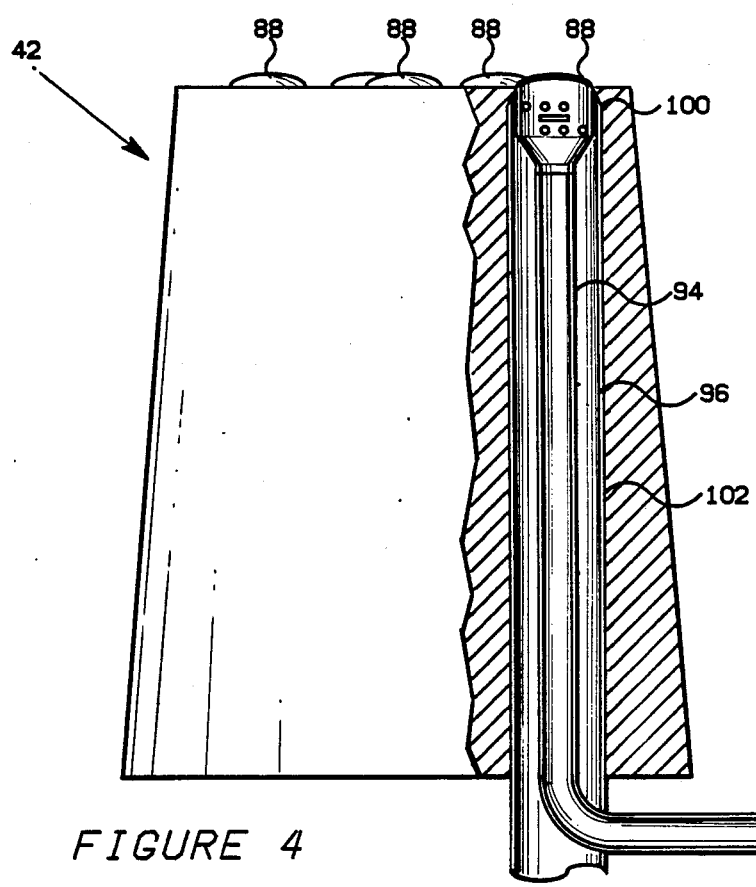
FIG. 4 is a side view of a portion of the apparatus shown in FIG. 3 with a portion broken away to show internal details.

Generally speaking, each of the bifluid nozzles 88 comprises an inner tube 94 and an outer tube 96. (See FIG. 4) The inner tube 94 is preferably coaxially positioned within the outer tube 96. The end 98 of the inner tube 96 protrudes past the end 100 of the outer tube 96. The tubes are positioned in a passage 102 which extends longitudinally through the plug member 64. The end 100 of the outer tubular member 96 is preferably positioned about flush with the upper end surface 74 of the plug member 64. The end 98 of the inner tubular member 94 preferably protrudes slightly above the upper end surface 74 of the plug member 64. (See FIG. 5) A wall member 104 connects the end 100 of the outer tube 96 to a sidewall 106 of the inner tube 94. The end 98 of the inner tube 94 is at least partially closed by a suitable end closure such as cap 108. The slot 90 is cut through the end closure 108 on the inner tubular member 94. The slot extends partially across the cap 108, preferably elongated diametrically across with respect to the tubular member 94. The sidewall 106 of the inner tubular member 94 is provided with a plurality of apertures 109 extending through the sidewall 106 and establishes a plurality of flow paths between the inside of the inner tubular member 94 and an annulus 110 which is defined between the inner tube 94 and the outer tube 96 adjacent the second end 100 of the outer tube 96. For good results, the apertures 109 are preferably generally radially oriented with respect to a longitudinal axis 112 of the inner tubular member 94. To further enhance mixing, a plate baffle 114 can be positioned in the inner tubular member 94, preferably at right angles to the longitudinal axis 112 mounted by typical four support rods 115. A disc baffle coaxially mounted in the inner tubular member 94 is presently preferred. In use, it is preferred to connect the steam source to the annulus 110 between the inner tubular member 94 and the outer tubular member 96 and the source of oil feedstock to the inner tubular member 94.

In accordance with certain other aspects of the invention, an oil feedstock is introduced into a stream of hot cracking catalyst particles. The feedstock is introduced as the hot cracking catalyst particles are moving radially inwardly from the periphery around the end of a plug. The particles of cracking catalysts are caused to flow around the end of the plug by first being flowed longitudinally through a lift pot in an annular stream with the plug in the center of the annulus and then in a radially inwardly directed stream past the end of the plug due to the upper confines of the lift pot. At that point, the oil feedstock is injected to form a reaction mixture and the reaction mixture flows generally longitudinally into the riser-reactor.

Desirably, the riser-reactor is provided with a generally cylindrical vaporization zone, a generally frustoconical expansion zone, and a generally cylindrical reaction zone sequentially arranged in axial alignment and the reaction mixture flows vertically upward in the riser-reactor through the generally cylindrical zone, the diverging expansion zone, the generally cylindrical zone and into a disengagement chamber. To provide good mixing of catalyst particles and oil feedstock, it is desirable that the catalyst particles and oil feedstock be moving at approximately right angles to each other at the point at which the oil feedstock is introduced into the stream of hot cracking catalyst particles. Generally the oil feed will be sprayed into the stream of hot cracking catalyst particles in admixture with steam to assist in vaporization and dispersal of the feed.

In the disengagement chamber, the cracked oil product is separated from the catalyst, and sent to a fractionization zone. The cracking catalyst, which contains coke deposits is passed to a stripping zone, stripped, and then passed by gravity to a regeneration zone for contact with an oxygen-containing gas to form the hot cracking catalyst particles. The hot cracking catalyst particles then feed into the lift pot from the regeneration zone. Generally speaking, the hot cracking catalyst particles are withdrawn from the regeneration zone through a generally vertically oriented standpipe and the flow rate is controlled as desired by one or more slide valves positioned in the standpipe. The catalyst then is passed along a downwardly inclined standpipe for introduction into the lift pot. Steam can be introduced into the lower portion of the lift pot to fluidize the catalyst. The fluidized catalyst is picked up by the flow of oil in atomizing gas from the end of the plug and drawn into the riser-reactor. Preferably, the oil and steam is emitted into the riser through a plurality of nozzles, each of which has a slotted outlet with the slot oriented in the direction of cracking catalyst flow.

EXAMPLE

The following table illustrates how the invention might be applied to a commercial cat cracker.

TABLE

| | Item | Design |
|---|---|---|
| | Charge Oil at 470° F. | |
| (25) | Recycle bottoms | 9,300 BPD |
| | Density | 11° API |
| (45) | Hydrotreated residuum | 47,500 BPD |
| | Density | 20° API |
| | Atmos. tower side draw gas oil | 2,500 BPD |
| | Density | 33° API |
| | Riser Steam Added at 470° F. | 40,000 lb/hr |
| | (41) + (43) + (46) | |
| (13) | Stripping Steam at 470° F. | 500 psig |
| | (41) + (43) 366° F. Blast Steam | 1,800 lb/hr |
| | (38) Regenerated Catalyst at 1280° F. | 45 ton/min |
| (30) | Air for Regeneration | |
| | Rate | 960,000 lb/hr |
| | Temperature | 440° F. |
| | Pressure | 55 psia |
| (6) | Regenerator | |
| | Pressure | 48 psia |
| | Temperature | 1280° F. |
| | Dimeter | 49 ft |
| | Length | 110 ft |
| (4) | Riser-Reactor (in sections from lift pot) | |
| (a) | Cylinder 82, length | 4 ft |
| | Diameter | 40 in. I.D. |
| (b) | Cone 86, length | 34 ft. 7 in. |
| | Diameter | 40 diverging to 50 I.D. |
| (c) | Cylinder 84, length | 103 ft. 9 in. |
| | Diameter | 50 in. I.D. |
| (d) | Cone Length | 3 ft. |
| | Diameter | 50 diverging to 54 I.D. |
| (e) | Cylinder length | 20 ft. 3 in. |
| | Diameter | 54 in. I.D. |
| (38) | Regenerated catalyst standpipe | 40 in. I.D. |
| (50) | Lift pot cylinder, diameter | 88 in. |
| | Height | 72 in. |
| (74) | Top diameter of nozzle support structure | 40 in. |
| (72) | Bottom diameter of nozzle support structure | 50 in. |
| (74),(60) | Annulus throat | 14.5 in. from item (74) to (60) |
| (66) | 8 Nozzles in frustoconical structure with insulation around nozzles and insulcrete cover. Tips of nozzles exposed | |
| (90) | Outer nozzles - center distance to outer edge of top diameter | 7 in. |
| | center distance to structure center | 13 in. |
| (94) | Inner oil pipe - (in) | 4 diverging to 6 I.D. |
| (96) | Outer steam pipe | 8 inches |
| (90) | Slot length 2.6 inches | |
| (109) | ½ inch diameter holes - 2 rows with 16 holes - 9 holes in bottom row and 7 holes in top row with staggered holes from row to row | |
| (114) | ½ inch by 3.1 inch disc impingement baffle supported by at least four ½ inch diameter (item 115) compression rods welded to inside of weld cap (108) | |
| (108) | 7 in. outside diameter weld cap, extra hard face inside and out (Stellite #1) cut 2.6 in. wide slot for full 7-inch length top | |
| (106) | Longitudinal distance on nozzle | |
| (a) | from weld on 6 in. I.D. to first row of holes | 1.5 inches |
| (b) | from first row to second row of holes | 2 inches |
| (c) | from second row to weld cap end | 1.5 inches |
| (d) | from weld cap end to slot bottom | 1.6 inches |

| Item | Design |
| --- | --- |
| (92) | fourteen 1-inch diameter steam nozzles for dispersion |

What is claimed is:

1. Apparatus comprising:
   (a) a catalyst lift pot having an upper end, a lower end, and a generally cylindrical sidewall having an interior surface defining a first diameter;
   (b) a riser-reactor connected to the upper end of the lift pot, said riser-reactor having a mouth defining a second diameter where it connects to the lift pot which is smaller than the lift pot first diameter;
   (c) a plug member extending axially into the lift pot from the lower end of the lift pot, said plug member being generally rotationally symmetric about its longitudinal axis and having an upper end surface which faces the mouth of the riser-reactor, said lift pot, said riser-reactor and said plug member being construct and arranged so that fluid flowing through the lift pot before flowing into the riser-reactor flows radially inward across the upper end surface of the plug member;
   (d) a means for introducing a fluidizable catalyst through the sidewall of the catalyst lift pot between the plug member and the generally cylindrical interior surface of the lift pot; and
   (e) a means for releasing a liquid oil feedstock and an atomizing fluid into the lift pot from the upper end surface of the plug member, wherein the means for releasing liquid oil feedstock and atomizing fluid comprises at least one bifluid nozzle opening into the lift pot on the upper end surface of the plug member, wherein said at least one nozzle comprises an outer tube, having an end, and a coaxially positioned inner tube, having an end and a side wall, defining an annulus between the inner tube and outer tube, the end of the outer tube being connected to the outside of the inner tube by a wall, the end of the inner tube protruding past the end of the outer tube and having a cap affixed thereto with a slot extending at least partially across it, the sidewall of the inner tube having a plurality of apertures connecting the inside of the inner tube and the annulus between the inner tube and the outer tube, and a plate baffle mounted inside of the inner tube and extending partially thereacross.

2. Apparatus as in claim 1 wherein the means for introducing fluidizable catalyst into the catalyst lift pot comprises a tubular member opening into the lift pot through the generally cylindrical sidewall positioned to feed catalyst particles into the lift pot.

3. Apparatus as in claim 2 wherein the plug member is frustoconically shaped and tapers toward the riser-reactor and the upper end surface of the plug has about the same diameter as the mouth of the riser-reactor.

4. Apparatus as in claim 3 wherein the riser-reactor includes a first generally cylindrical portion having the second diameter connected to the lift pot, a second generally cylindrical portion having a third diameter which is larger than the second diameter, and a generally frustoconically shaped portion which connects the first generally cylindrical portion with the second generally cylindrical portion, said first generally cylindrical portion, the frustoconically shaped portion and the second generally cylindrically shaped portion being coaxially aligned and vertically oriented.

5. Apparatus as in claim 4 further comprising a disengagement chamber at an upper end of the riser-reactor and a regenerator, connected to the disengagement chamber, which is positioned to gravity feed from the disengagement chamber, and the tubular member which opens through the generally cylindrical sidewall of the lift pot is connected to the regenerator.

6. Apparatus as in claim 5 wherein the at least one bifluid nozzle comprises a plurality of bifluid nozzles.

7. Apparatus as in claim 6 wherein said plurality of nozzles includes 3 to about 12 nozzles circumferentially spaced apart around the center of the upper end surface of the plug member with the slots radially oriented with respect to the center and at least one of said 3 to about 12 nozzles is positioned on or near the center of the upper end surface of the plug member.

8. Apparatus as in claim 7 further comprising a source of steam connected to the annulus between the inner tube and the outer tube and a source of oil feedstock connected to the inner tube.

9. Apparatus as in claim 8 further comprising a plurality of conduits connected to the steam source opening into the lift pot from the upper end surface and the plug member independently from the bifluid nozzles.

* * * * *

UNITED STATES PATENT AND TRADEMARK OFFICE
CERTIFICATE OF CORRECTION

PATENT NO. : 4,681,743

DATED : 7/21/87

INVENTOR(S) : Frank W. Skraba

It is certified that error appears in the above-identified patent and that said Letters Patent is hereby corrected as shown below:

Column 9, claim 1, line 24, "construct" should read ---constructed---.

Column 10, claim 9, line 49, "and" should be ---of---.

Signed and Sealed this

Twenty-sixth Day of April, 1988

Attest:

DONALD J. QUIGG

*Attesting Officer*    *Commissioner of Patents and Trademarks*